United States Patent [19]

Newman et al.

[11] Patent Number: 5,125,728
[45] Date of Patent: Jun. 30, 1992

[54] SOFT CONTACT LENS FOR THE CORRECTION OF ASTIGMATISM

[75] Inventors: Steve Newman, Sunnybank Hills; Don Noack, Springwood, both of Australia

[73] Assignee: Igel International Limited, Bedfordshire, United Kingdom

[21] Appl. No.: 548,911
[22] PCT Filed: Feb. 3, 1989
[86] PCT No.: PCT/AU89/00044
§ 371 Date: Oct. 2, 1990
§ 102(e) Date: Oct. 2, 1990
[87] PCT Pub. No.: WO89/07303
PCT Pub. Date: Aug. 10, 1989

[30] Foreign Application Priority Data

Feb. 3, 1988 [AU] Australia ............................. PI6564

[51] Int. Cl.⁵ ............................................... G02C 7/04
[52] U.S. Cl. ................................................. 351/160 H
[58] Field of Search ............... 351/160 R, 160 H, 161, 351/162

[56] References Cited

U.S. PATENT DOCUMENTS 4,256,369 3/1981 Wichterle ...................... 351/160 H
4,508,436 4/1985 Sitterle ......................... 351/160 H
4,549,794 10/1985 Loshaek et al. .............. 351/160 H X
4,573,774 3/1986 Sitterle ......................... 351/160 H Primary Examiner—Scott J. Sugarman
Attorney, Agent, or Firm—Townsend and Townsend

[57] ABSTRACT

The invention is incorporated to a soft contact lens. This lens has a concave posterior surface for fitting to the eye of a wearer, and a convex anterior surface for exposure from the eye of a wearer. The soft contact lens contains a correction for the eye having a component of astigmatism. A novel posterior surface has a central refractive segment sufficient in dimension to afford pupil coverage and therefore correction to the vision of the eye of the wearer. This central portion is configured for imparting a component of astigmatic correction of the eye of a wearer in a first central zone containing the refractive segment. When the contact lens is worn, this first central zone is juxtaposed to the central portion of the eye of the wearer. The posterior surface at the first central zone is surrounded by a posterior zone for fititng the soft contact lens to the eye of the wearer. This posterior zone about said first central zone has as its main purpose the maintenance of the contact lens to the eye of the wearer. Since by exclusion, it does not have substantial pupil coverage, it is tailored to the keratometry of the eye and enables the lens to be maintained on the eye. By combining the posterior central zone with the anterior portion of the lens, an arbitrary amount of refractive correction of error to the eye of the wearer can be accommodated.

23 Claims, 6 Drawing Sheets

SOFT CONTACT LENS FOR THE CORRECTION OF ASTIGMATISM

The present invention relates to contact lenses and in particular relates to a new design for spherical and toric lenses whereby in addition to designing the front surface of a lens the back surface of a lens may be designed for distance correction without compromise to the comfort of the wearer.

BACKGROUND OF THE INVENTION

In the past, soft contact lenses have been designed according to the corneal shape to afford maximum stability, fit and comfort for the wearer such that there is an optimum relationship between the corneal and/or scleral profiles and the back surface of the contact lens. The comfort has generally been achieved by not designing the back surface of a lens. Thus, correcting refractive error has been achieved by designing the front surface of the lens only.

The only exception to this design philosophy has been one form or another of back surface bifocal. This type of lens is of a specific nature and is designed only to correct presbyopia (a condition whereby the eye has some loss or reduction in its power of accommodation). Hence a lens can be made with two or more focal lengths by adding a number of curves to the back or front surfaces on the lens.

Designing contact lenses primarily by back surface comfort criteria has a number of attendant disadvantages which arise with the aim to gain close proximity between the lens and the corneal/scleral profile. One disadvantage is that all refractive error must be corrected from the front surface geometry alone, thus restricting the designer in his/her choice of anterior topography.

Also lens thickness is increased peripherally as the lens power increases. Designers can reduce the front optic zone to a certain extent in order to offset this unwanted thickness somewhat, but they are limited to how small they can go.

Furthermore in back surface toric designs the extension of the toricity out to or towards the circumference of the lens will result in thick and thin areas throughout the lens. This can result in uneven lid forces being exerted on the lens during the blinking phase and cause lens rotation.

SUMMARY OF THE INVENTION

The present invention seeks to overcome the aforesaid disadvantages of the prior art lenses by providing a contact lens, either spherical or toroidal, which is designed with both back and front surface geometry thereby allowing greater design versatility in correcting the refractive error in the eye but without compromising a close comfortable proximity between the lens and the eye of the wearer.

It is one object of the present invention to provide a back lens surface which satisfies the comfort and fit criteria and allows an arbitrary amount of refractive correction of the eye whereby the amount of refractive correction is independent of the topography of the eye.

Due to the facility for re-design of the back surface of the lens the enabled anterior format of the toric lens design is such that the traditional prism or wedge forms normally used to locate the lens' axis stability have been rendered obsolete. There is now provided a front surface design versatility enabled by virtue of the unique back surface format which allows a predetermined front optic junction thickness. The new design versatility in the lens of the present invention has created a number of significant advantages over the prior art lens designs.

Firstly, the lens thickness can be kept to a minimum by relieving the front surface geometry of handling all of the refractive error on its own.

Toric lenses can now be manufactured with an absolutely spherical periphery, thus affording the lids an even surface upon which to blink. This, now, affords the designer an enormous advantage in stabilizing the lens during the blinking phase. If used, any prisms, or wedges used for stabilizing the lens, will have a far more even effect on the lids than previous designs have allowed.

Furthermore, the present invention allows a large range of toric parameters to be covered from a small, concise base stock unit. This type of stock unit is only possible with a toric base designed according to the embodiments of the present invention.

Whilst the main stabilizing areas of the lens of the present invention are positioned out onto the sclera at the widest parts of the area of lens that is selected, we have also chosen to curtail their intrusion back to the areas of lens which cover the cornea. By limiting these "wedges" or prism peaks from encroaching back in towards the centre of the lens the following 3 major advantages over the prior art are achieved.

Firstly, a "corridor" of least resistance which is formed and is presented to the upper lid during the blinking phase is widened considerably. E.g. rather than having a corridor of approximately 8.00 mm for a 14.00 mm diameter lens we now have a corridor of least resistance of approximately 12 mm thus giving a much wider path for the upper lid to follow.

This widening in minimal thickness area then increases sharply in thickness to the maximum height of the prism peaks. This sharper increase in thickness serves to "load" the pressure gradient of the upper lid during the blinking phase and create a much more positive stabilizing force. As the tarsal plate within the upper lid is of a bony nature this widening and sharpening of the pressure gradient equates to a far greater leverage on the lens than has been possible before.

Secondly, the wider corridor of least "resistance" or "minimal lens thickness" also provides for a far greater oxygen flow to the cornea, thus allowing the eye to retain, as close as possible, a normal metabolism.

The wider corridor of minimal thickness is now virtually identical in thickness profile to that of an equivalent sphere and thus eliminates any of the prior misgivings about fitting soft toric lenses i.e. the additional thickness incorporated into the traditional soft toric lens in order to maintain axis stability has now been made obsolete.

The lens designs will therefore provide the same amount of oxygen flow to the cornea (no matter what size) as will an equivalent sphere.

Thirdly, by virtue of the len's wide corridor of least resistance certain high powers can now be made much thinner than traditional spherical or torics. For example; when manufacturing lenses (whether they be spheres or torics) in the high minus power range, the peripheral areas of the optic area become quite thick due to the very nature of minus optics. This has always presented a physiological burden to the cornea as the oxygen flow decreases markedly through these areas.

By utilizing the len's wider area of minimal thickness (or least resistance) the high minus powers can be placed upon another optical area which provides for a minimal increase in peripheral thickness.

This can be described basically, as placing a minus optic on top of the plus optic.

This feature, combined with the len's minimal thickness over the corneal area, provides for a far thinner high minus range of powers than is traditionally possible and maintains the correct pressure gradient required for maximum axis (or rotational) stability.

In one broad form, the present invention comprises a contact lens comprising:

an anterior and/or posterior designed surface being adapted to provide at least one focal length.

In another form, the invention comprises a contact lens having a back surface adapted to enable correction of some or all of the distance correction.

In another form, the invention comprises a spherical or toroidal contact lens having its anterior and/or posterior surface designed for astigmatic correction and having an optimum and close relationship between the posterior surface of the lens and the corneal/scleral profile of the eye.

In a further form, the invention comprises a contact lens of the spherical, toroidal or prismatic type said lens comprising front surface and/or back surface geometry adapted to correct refractive error in the eye of a user whilst maintaining an optimum relationship to an proximity between the corneal scleral profile and the said back surface of the lens.

In its broadest form the present invention comprises a contact lens having its posterior only or posterior and anterior surface configured for astigmatic correction of the eye of a wearer and allowing an arbitrary amount of refractive correction of error in an eye of a wearer.

The present invention will now be described in more detail according to a number of preferred but accompanying illustration wherein

DESCRIPTION OF THE PREFERRED EMBODIMENTS

In the preferred embodiment of the invention the refractive power of the lens, whether it be spherical toroidal or prismatic is designed such that it is included in the back and front surfaces on the lens.

The back surface geometry of the lens includes a refractive segment or segments which are small enough to remain within the bounds of the front surface optic zone, are large enough to afford sufficient pupil coverage and yet are shallow enough not to interrupt the harmonious relationship between the posterior surface of the lens and the cornea.

The present invention controls the lens' axis stability by harnessing the lids natural forces to a far greater degree than current designs whilst improving the physiological performance of the lens over the mid peripheral to peripheral areas of the cornea.

This is achieved by placing the thickest areas of the stabilizing areas out onto the sclera, where oxygen transmissibility is not considered a priority. This therefore, maximizes the stabilizing effects of the upper lid by redirecting the lids pressure gradient both down and out, rather than the traditional downwards pressure gradient.

This also allows minimization of thicknesses across the lens surface which is immediately covering the cornea, thus improving oxygen transmissibility and further improving axis stability due to areas of least resistance.

The most critical area of this design concept has been to position the thickest portions of the stabilizing wedges on the sclera in such a position as to cause the lids no irritation during the blinking phase. This criticalness of position both ensures comfort and again improves axis stability. A further benefit in this design is the ability to sharply reduce these scleral wedge areas to create an absolutely even edge thickness. This edge thickness can be controlled to the same tolerances as a spherical lens.

Figure 1:
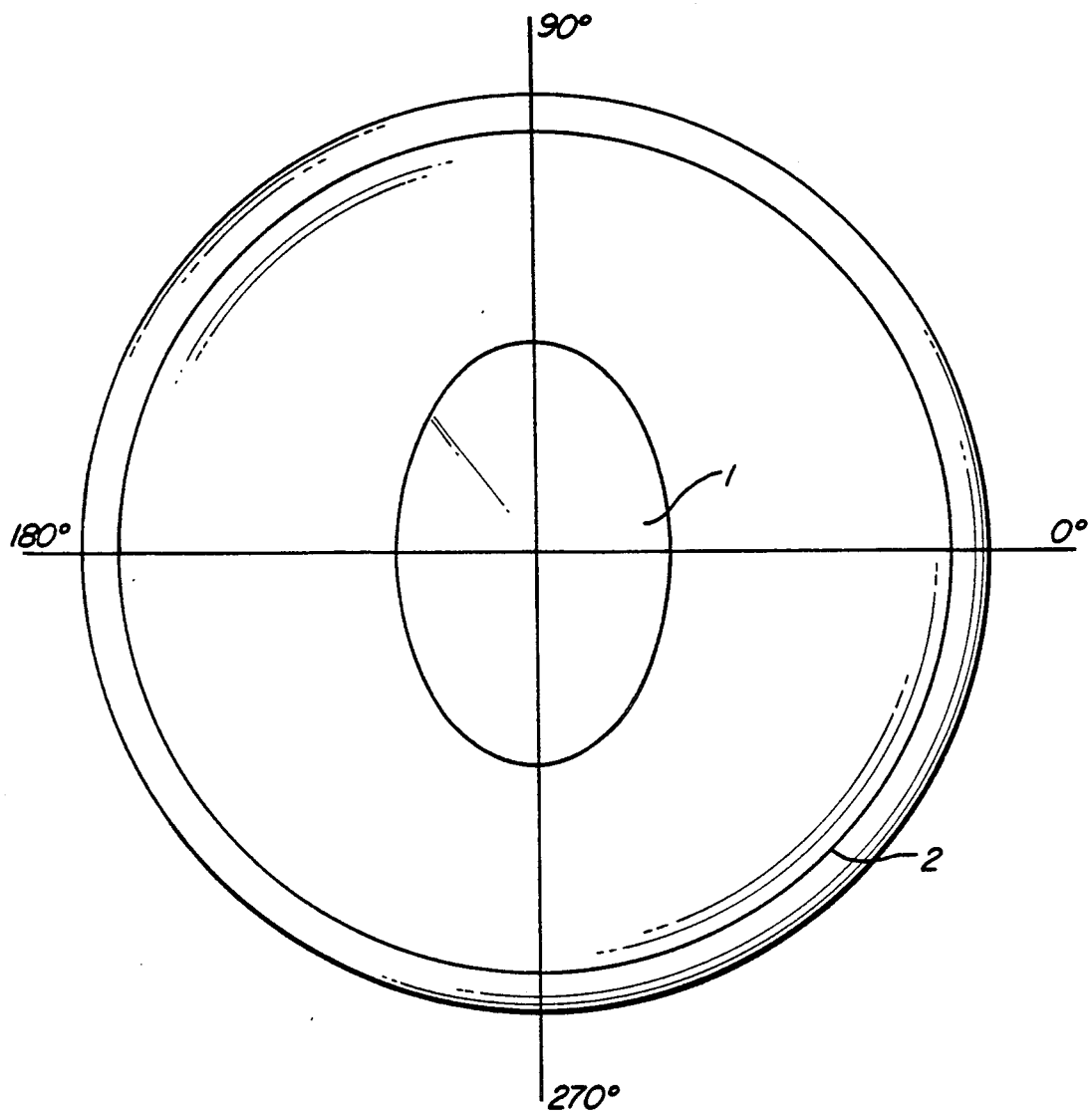
FIG. 1: shows a contact lens having a toric base segment with an spherical edge lift.
Figure 2:
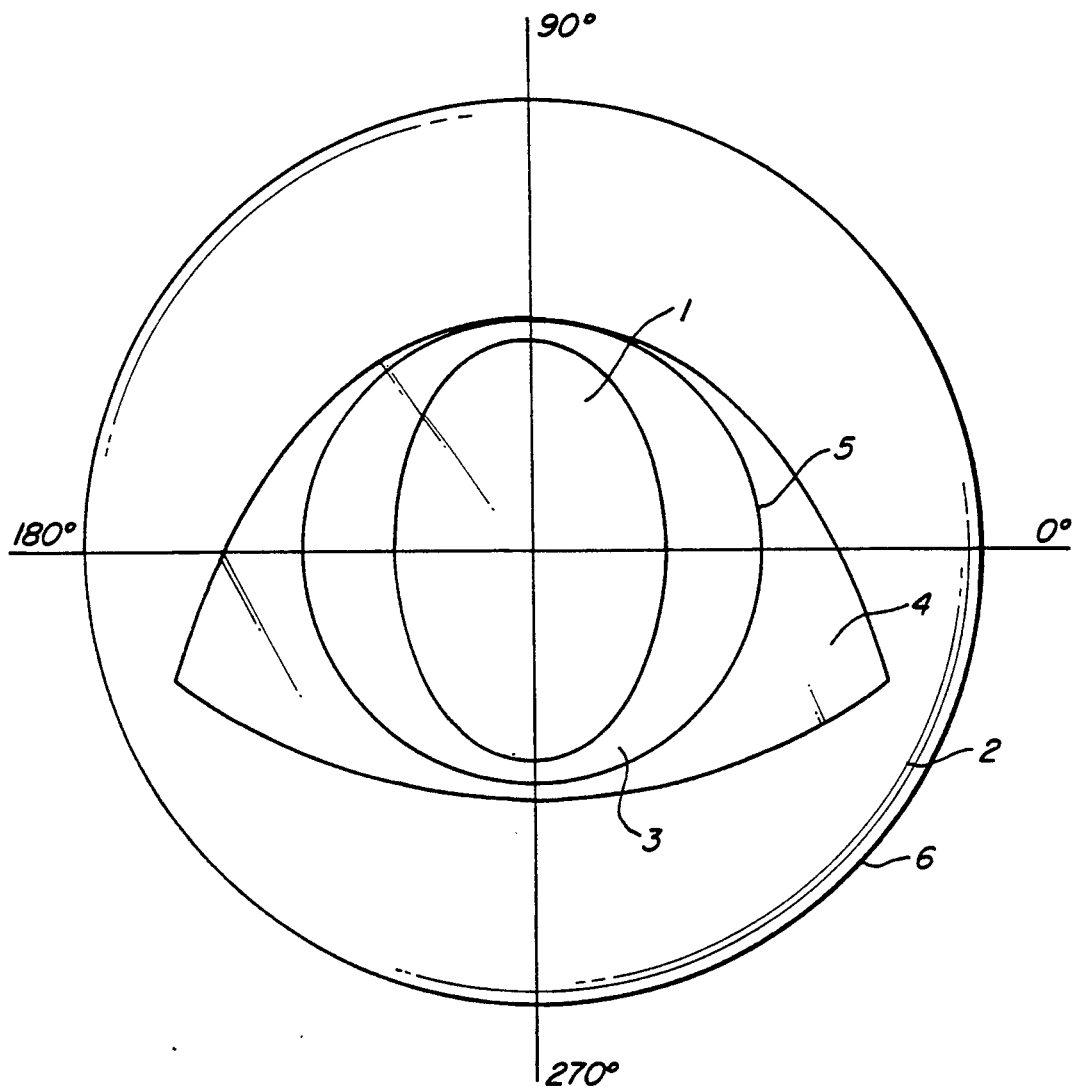
FIG. 2: shows a contact lens showing the base toric format with front surface geometry superimposed thereon.
Figure 3:
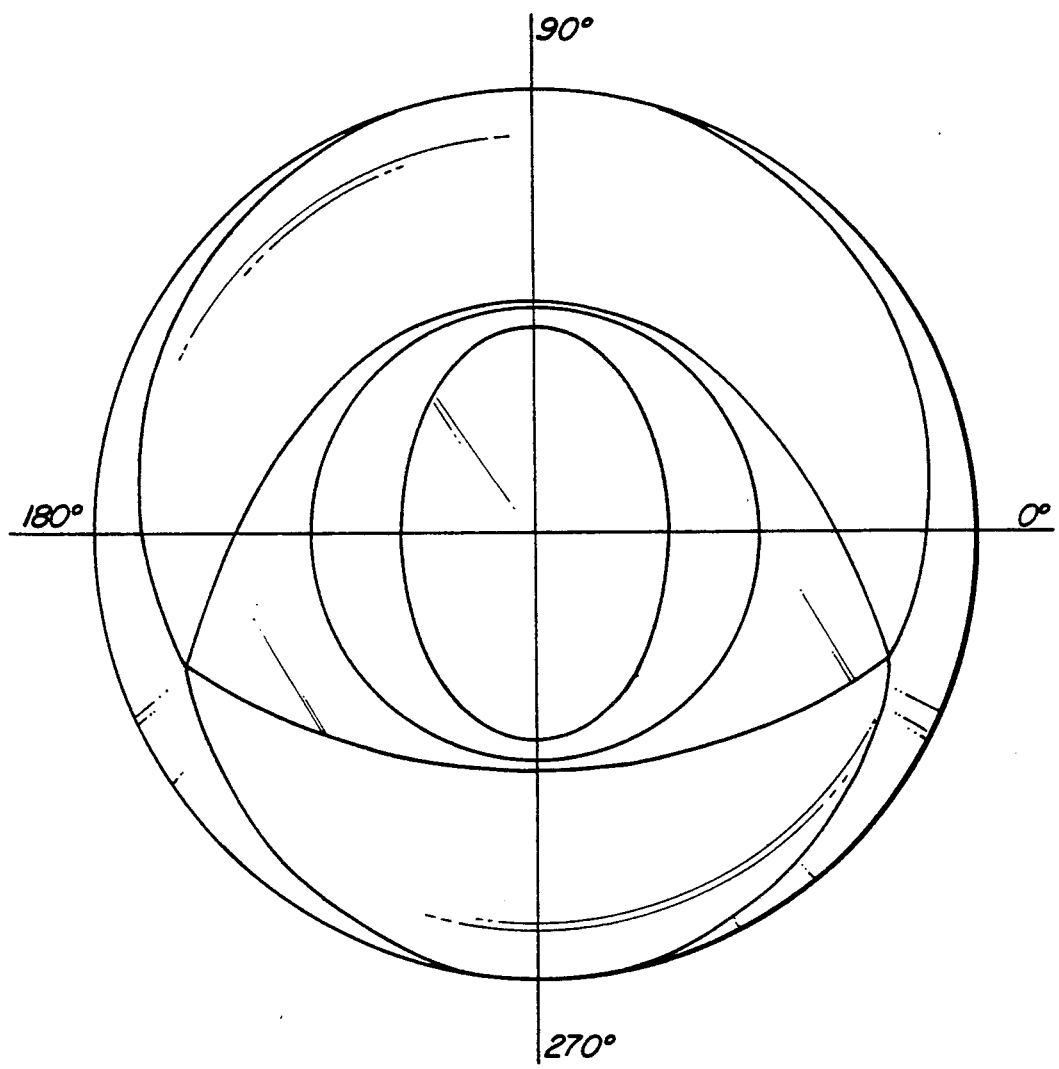
FIG. 3: shows a contact lens having a base toric format with front surface superimposed and showing an even thickness edge finish.

The posterior surface lens design can be used in both spherical an astigmatic corrections. The area of the posterior surface concerned in the design is restricted generally to within the central sixty percent of the lens as shown in FIGS. 1, 2 and 3 and may be formed by lathe cutting or moulding according to conventional techniques.

In the case of spherical minus correction, the facility of having part of the correction incorporated in the posterior surface results in a decreased average overall lens thickness. In comparison to lenses formed on a conditional posterior surface, there is a resultant physiological benefit from increased oxygen transmission over the mid peripheral area of the cornea.

In the case of astigmatic correction, the advantages apparent in spherical minus correction exist and thus lead to further advantages in correction of this type of error for instance; lathe cutting or moulding of the toroidal (astigmatic) surface ensures reproduction, restiction of the toroidal (astigmatic) surface to the central area of the lens enables the hydrostatic pressure advantage of back surface toric lenses, to have an effect in the area of maximum corneal toricity.

Restriction of the toroidal (astigmatic) surface to the central area of the lens, combined with lathe cutting or moulding of this area within a spherical, conic, or aspheric surface, ensures that in this remaining area these surfaces are coplanar. This outer area of the lens is traditionally the area used to stabilise and orientate the lens in the eye. The certainty of a coplanar are free of thick and thin areas from the astigmatic correction, the results of relaxation of a crimped or buckled lens, enables the location method used, be it prism or any other means, to be of reduced magnitude. The result is a thinner lens in this area with consequent physiological and comfort advantages.

The design can be utilised to incorporate bifocals (both segmented and progressive) and prismatic correction in the visual area of the lens. The concept of the design of the lens, including an interrelationship between both the anterior and posterior surfaces, results in thinner, even junctions at the edge of the front optic zone, which in turn enables the locating thickness of the lens to progressively increase towards the periphery of the lens with its thickest area resting on the sclera. Nothwithstanding this increasing thickness, the final edge of the lens is of uniform thickness around its circumference.

A further result of the interelation of the design of both anterior and posterior surfaces of the lens, and the uniformity of parameters in this mid peripheral area which is used for location of toric (astigmatic) lenses, is that the front surface configuration exhibited in this area is identical throughout the majority of powers of lenses with only slight variations in the more unusual high refractive errors.

FIG. 1 shows a lens according to one embodiment of the invention. The figure shows a toric base segment 1 and a spherical periphery 2 having an edge lift or lens stabilising capability.

Figure 4:
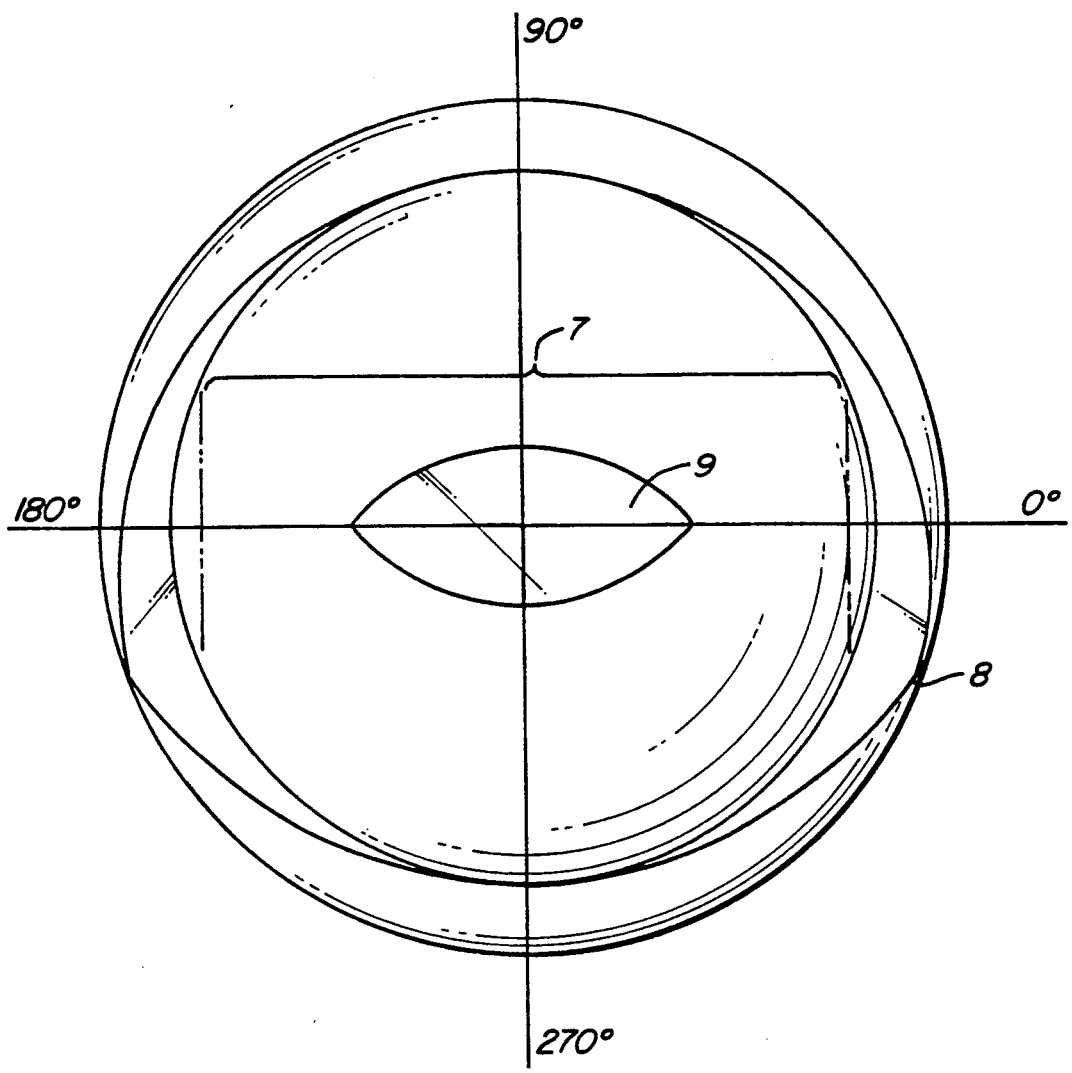
FIG. 4: shows a contact lens having stabilising prism peaks located at the lens periphery and located pproximately 65% of the way down from the top of the lens.

FIG. 2 shows the format design of the lens of FIG. 1 but this time the lens has a front surface design superimposed thereon. The design imposed is one possible embodiment only. The lens has a front optic zone and stabilising prisms 4 according to one design possibility. There is a constant thickness at the junction 5 between the front optic zone and the stabilising prisms. Spherical edge finish 6 has an even thickness through 0°–360°. FIG. 3 shows a lens according to one embodiment having an alternative edge finish. FIG. 4 shows a lens with a constant spherical edge thickness showing a corridor 7 which provides an area of least line of resistance along the lens. This area facilitates greater oxygen transmission through the lens to the eye of the wearer. FIG. 4 also shows locating prisms 8. The prism peaks are at the outer periphery and are located approximately 65% of the distance down from the top of the lens. The prism portion 8 is the thickest part of the lens and this tapers very sharply down to a constant edge thickness at the periphery. The prisms form the predominant locating areas of the lens and are positioned in this arrangement to extract the widest possible stabilising influence from the lid whilst allowing a wide passage of near parrallel to parallel thickness through the centre and mid peripheral areas of the lens. Back optic zone 9 shows relative proportionality between it and corridor 8.

Figure 5:
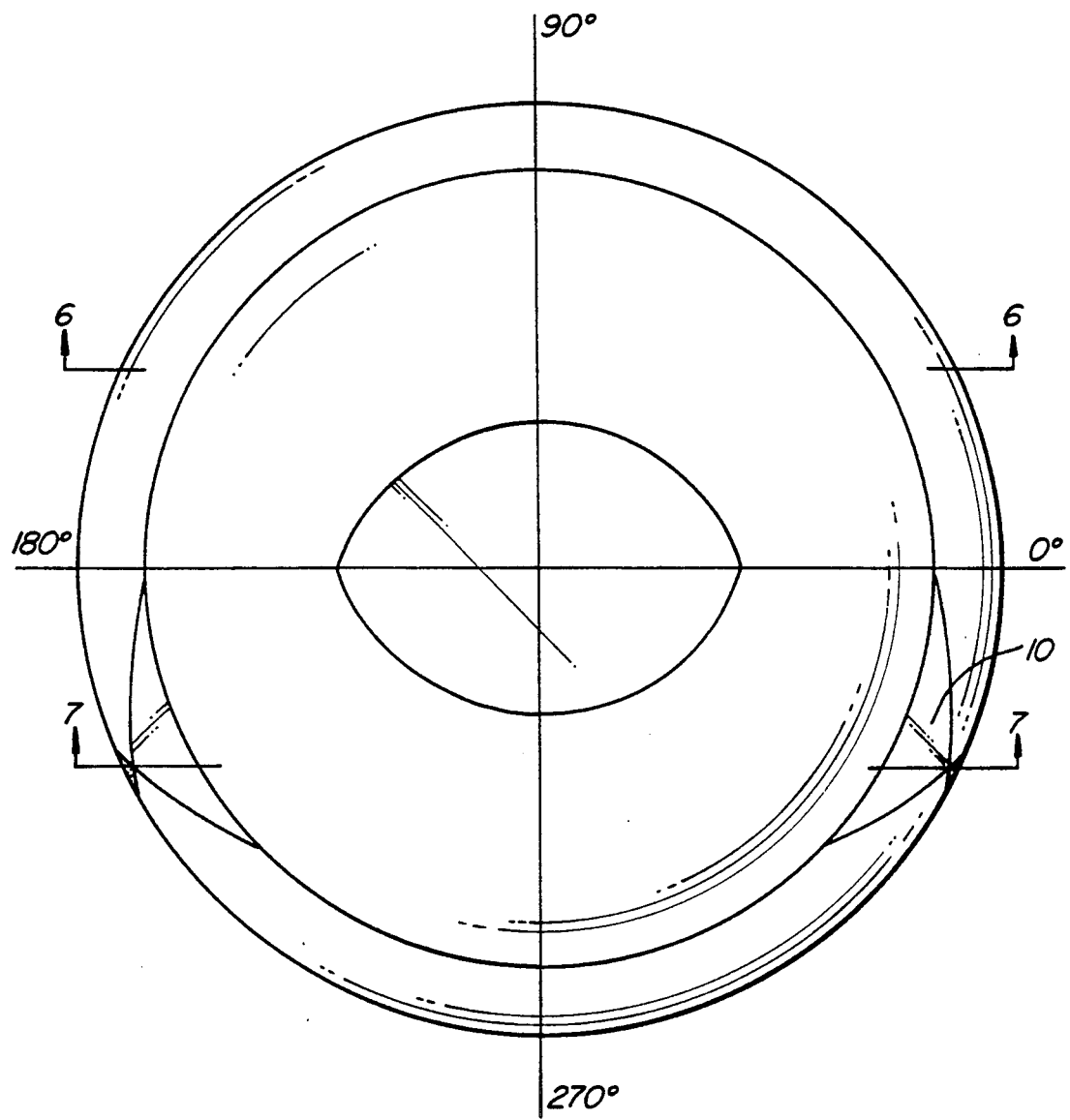
FIG. 5: shows a varied lens design showing more pronounced prism peaks.

FIG. 5 shows an alternative prism configuration 10 and a back optic zone 11. Back optic zone diameter in longest meridan is determined by the cylinder amount but its nominal value would not exceed 7.00 mm.

Figure 6:
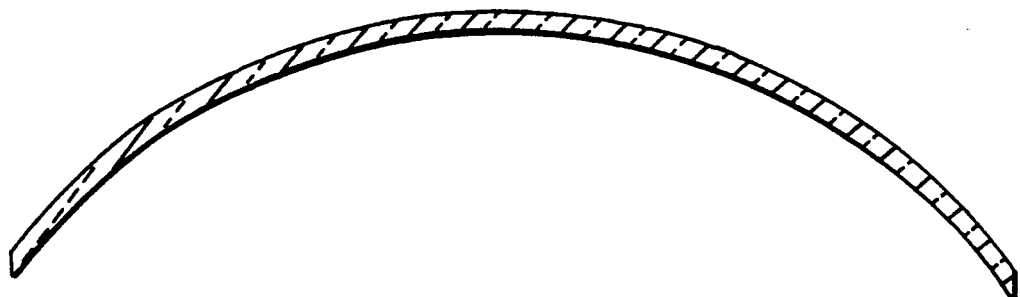
FIG. 6: shows a cross sectional view of the lens of FIG. 5 taken across a line A—A.

FIG. 6 shows one cross section of the lens of FIG. 5 illustrating the near parallel thickness across lens 5 along line A—A.

Figure 7:
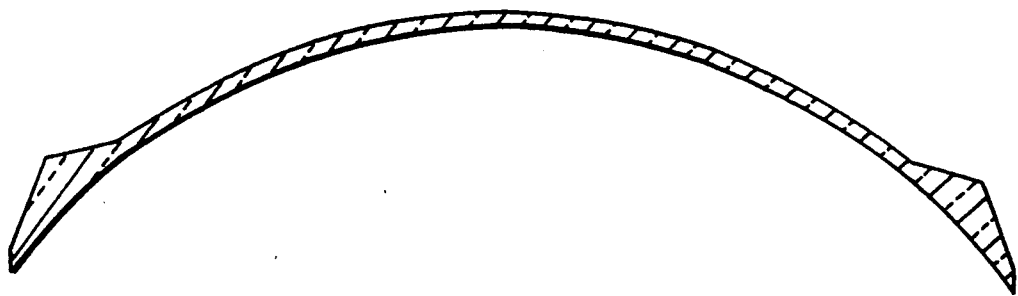
FIG. 7: shows a cross sectional view of the lens of FIG. 6 taken across a line B—B showing the stabilizing prism peaks.

FIG. 7 shows another cross section of the same lens across line B—B showing the sharp increase from the corridor of least resistance to the prism peaks with the prism peaks located out on the Sclera.

It will be recognised by persons skilled in the art that numerous variations and modifications can be made to the present invention without departing from the overall spirit and scope of the invention as broadly described herein.

What is claimed is:

1. A soft contact lens having a concave posterior surface for fitting to the eye of a wearer, a convex anterior surface for exposure from the eye of a wearer, and said soft contact lens containing a correction with an astigmatic component for the eye, the improvement to said soft contact lens comprising:

said posterior surface including a refractive segment sufficient in dimension to afford substantial pupil coverage, said refractive segment configured for at least some of the correction of the eye of a wearer including an astigmatic component in a first central zone, said first central zone being juxtaposed to the central portion of the eye of a wearer;

said posterior surface at said first central zone being surrounded by a second posterior zone for fitting said soft contact lens to the eye of the wearer about said first central zone to maintain said contact lens to the eye of the wearer;

said first central zone in combination with said anterior surface of said lens allowing an arbitrary amount of refractive correction of error in the eye of said wearer.

2. A soft contact lens according to claim 1 wherein the refractive error of an eye is corrected by proportionate distribution of design geometry between the anterior and posterior surface of the lens.

3. A soft contact lens according to claim 2 wherein the posterior surface includes a refractive segment or segments which form the only astigmatic surface of said lens for refractive correction.

4. A soft contact lens according to claim 3 wherein the said segment or segments are small enough to remain within the bounds of a front surface optic zone but large enough to afford sufficient pupil coverage according to the astigmatic correction requirements of the wearer.

5. A soft contact lens according to claim 4 wherein the lens has stabilizing means to impart rotational stability to said lens and to stabilize said lens on the eye of the wearer.

6. A soft contact lens according to claim 5 wherein the astigmatic surface is confined to a central area comprising 60% of the overall surface area of the lens.

7. A soft contact lens according to claim 6 wherein the peripheral area of the lens surface is coplanar spherical surface.

8. A soft contact lens according to claim 7 wherein the locative thickness of the lens progressively increases towards the periphery of the lens with the thickest area resting on the sclera.

9. A soft contact lens according to claim 8 wherein the outer peripheral edge of the lens has a peripheral surround of uniform thickness.

10. A soft contact lens according to claim 9 wherein the anterior surface has stabilizing wedges whose thickest portions are positioned on the sclera in such a position as to minimize or eliminate eyelid irritation during the blinking of the eye of a wearer.

11. A soft contact lens according to claim 10 wherein the scleral edge has a even thickness.

12. A soft contact lens according to claim 11 wherein the front surface configuration of the mid peripheral area of the lens remains unchanged for the refractive correction of error of said lenses.

13. A soft contact lens according to claim 12 wherein the focal length or lengths of the lens may be increased by adding a number of curves to the posterior or anterior surfaces of the lens.

14. A soft contact lens according to claim 13 wherein the lens is stabilized on the eye by the configurational design of the said central area wherein harnessing the eyelid forces of the wearer takes place.

15. A soft contact lens according to claim 14 wherein the lens is made having a spherical periphery providing an even surface for contact between lens and eyelid.

16. A soft contact lens according to claim 15 wherein the posterior surface is configured to allow a controlled anterior optic junction thickness.

17. A soft contact lens according to claim 16 wherein the lens stabilizing areas are positioned out onto the sclera at the widest part of the lens.

18. A soft contact lens according to claim 17 wherein a corridor is provided on the anterior surface and whose width is slightly less than the overall diameter of the lens, said corridor providing a path of least resistance for the upper eyelid to follow during blinking.

19. A soft contact lens according to claim 18 wherein the thickness of the lens along the corridor increases sharply to the maximum height of prism peaks located on the lens surface at or near the periphery of said lens said prism peaks providing said stabilizing means for said lens.

20. A soft contact lens according to claim 19 wherein the said corridor provides the facility for increased oxygen flow from the anterior to the posterior surface of the eye thereby allowing normal eye metabolism.

21. A soft contact lens according to claim 20 wherein the configuration of the said corridor along said path of least resistance for the upper eyelid to follow during blinking enables maintenance of a eyelid pressure gradient distributed across said path which achieves maximum rotational stability of lens when an eyelid passes over said lens.

22. A soft contact lens according to claim 21 wherein the said prism peaks are positioned out on the sclera of the lens, said maximum thickness decreasing sharply to a constant edge thickness.

23. A soft contact lens according according to claim 1 and wherein the amount of refractive correction achieved by the lens design is independent of the topography of the eye of the wearer.

* * * * *